(12) United States Patent
Boorse

(10) Patent No.: US 8,663,587 B2
(45) Date of Patent: Mar. 4, 2014

(54) CATALYZED SOOT FILTER AND EMISSIONS TREATMENT SYSTEMS AND METHODS

(75) Inventor: R. Samuel Boorse, Skillman, NJ (US)

(73) Assignee: BASF Corporation, Florham Park, NJ (US)

(*) Notice: Subject to any disclaimer, the term of this patent is extended or adjusted under 35 U.S.C. 154(b) by 188 days.

(21) Appl. No.: 13/100,663

(22) Filed: May 4, 2011

(65) Prior Publication Data

US 2011/0274601 A1 Nov. 10, 2011

Related U.S. Application Data

(60) Provisional application No. 61/331,455, filed on May 5, 2010.

(51) Int. Cl.
| | |
|---|---|
| *B01D 53/56* | (2006.01) |
| *B01D 53/94* | (2006.01) |
| *B01J 8/02* | (2006.01) |
| *C01B 21/00* | (2006.01) |
| *C01B 23/00* | (2006.01) |
| *C01B 25/00* | (2006.01) |
| *C01B 35/00* | (2006.01) |
| *C01G 28/00* | (2006.01) |
| *C01G 30/00* | (2006.01) |
| *B01J 23/00* | (2006.01) |
| *B01J 23/70* | (2006.01) |
| *B01J 23/74* | (2006.01) |
| *B01J 23/72* | (2006.01) |
| *F01N 3/10* | (2006.01) |
| *B01D 50/00* | (2006.01) |

(52) U.S. Cl.
USPC ........ 423/213.2; 502/300; 502/338; 502/345; 60/301; 422/171

(58) Field of Classification Search
USPC ............ 423/300–355; 502/213.2, 213.5, 235, 502/237, 238; 60/301; 422/171
See application file for complete search history.

(56) References Cited

U.S. PATENT DOCUMENTS

| | | | |
|---|---|---|---|
| 3,111,396 | A | 11/1963 | Ball |
| 4,010,238 | A | 3/1977 | Shiraishi et al. |
| 4,085,193 | A | 4/1978 | Nakajima et al. |
| 5,221,484 | A | 6/1993 | Goldsmith et al. |
| 6,162,415 | A | 12/2000 | Liu et al. |
| 6,171,566 | B1 * | 1/2001 | Ku et al. ............... 423/239.1 |
| 7,119,044 | B2 | 10/2006 | Wei et al. |
| 7,264,789 | B1 | 9/2007 | Verduijn et al. |
| 7,601,662 | B2 | 10/2009 | Bull et al. |
| 7,767,175 | B2 * | 8/2010 | Golden et al. ........... 423/213.2 |
| 7,943,097 | B2 * | 5/2011 | Golden et al. ............ 422/180 |
| 2009/0025375 | A1 | 1/2009 | Poojary et al. |

(Continued)

FOREIGN PATENT DOCUMENTS

| | | |
|---|---|---|
| EP | 0766993 | 4/1997 |
| WO | WO-2008/106519 | 9/2008 |

*Primary Examiner* — Anthony J Zimmer
(74) *Attorney, Agent, or Firm* — Melanie L. Brown

(57) ABSTRACT

Catalysts, catalytic articles, and catalyst systems and methods for treating exhaust gas streams utilizing the catalytic articles are described. In one or more embodiments, a catalytic article includes a first SCR catalyst permeating the porous walls of a substrate and a second SCR catalyst coating the walls of the substrate. Methods for treating an exhaust stream are also provided. Methods of making and using such catalysts and catalytic articles are also described.

33 Claims, 3 Drawing Sheets

(56) References Cited

U.S. PATENT DOCUMENTS

| | | | |
|---|---|---|---|
| 2009/0104096 A1* | 4/2009 | Patchett et al. | 423/213.5 |
| 2009/0208394 A1 | 8/2009 | Li et al. | |
| 2009/0285737 A1 | 11/2009 | Bull et al. | |
| 2010/0000202 A1 | 1/2010 | Fisher et al. | |
| 2010/0077738 A1* | 4/2010 | Cavataio et al. | 60/301 |
| 2010/0101221 A1* | 4/2010 | Charbonnel et al. | 60/301 |

* cited by examiner

CATALYZED SOOT FILTER AND EMISSIONS TREATMENT SYSTEMS AND METHODS

CROSS-REFERENCE TO RELATED APPLICATIONS

This application claims the benefit of U.S. Patent Provisional Application No. 61/331,445, filed on May 5, 2010, the content of which is specifically incorporated by reference herein in its entirety.

TECHNICAL FIELD

The invention pertains to catalyzed soot filters, methods for their manufacture, and methods of treating emissions in an exhaust stream.

BACKGROUND

Diesel engine exhaust is a heterogeneous mixture which contains not only gaseous emissions such as carbon monoxide (CO), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of the total particulate matter.

One after treatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus the accumulating particles have to be continuously or periodically burned out of the filter to maintain an acceptable back pressure.

Filters coated with Selective Catalytic Reduction (SCR) catalysts may be considered for the reduction of size and cost of the next generation diesel emissions control systems for CO, HC, $NO_x$ and particulate matter. In SCR processes, $NO_x$ is reduced with ammonia ($NH_3$) to nitrogen ($N_2$) over a catalyst typically composed of base metals. The application of SCR catalysts to high porosity filter substrates has allowed a reduction in system size while maintaining filtration efficiency and $NO_x$ conversion. High porosity filters with large mean pore size (20 µm or more) and narrow pore size distribution have shown to be advantageous because they allow the best catalyst utilization with the lowest back pressure increase.

Catalyzed wall flow filters containing a catalyst that promotes SCR of $NO_x$ assume two functions: removal of the particulate component of the exhaust stream and conversion of the $NO_x$ component of the exhaust stream to $N_2$. SCR-coated wall flow filters that can achieve $NO_x$ reduction goals require a sufficient loading of SCR catalyst composition on the wall flow filter under the usual space constraints in a vehicle. The gradual loss of the catalytic effectiveness of the compositions that occurs over lifetime through exposure to certain deleterious components of the exhaust stream or high temperatures augments the need for higher catalyst loadings of the SCR catalyst composition. However, preparation of coated wall flow filters with higher catalyst loadings can lead to unacceptably high back pressure within the exhaust system. An increase in backpressure can have an adverse impact on fuel efficiency.

An additional aspect for consideration in coating the wall flow filter is the selection of the appropriate SCR catalyst composition. First, the catalyst composition must be thermally durable so that it maintains its SCR catalytic activity even after prolonged exposure to higher temperatures that are characteristic of filter regeneration. For example, combustion of the soot fraction of the particulate matter often leads to temperatures above 700° C. and higher. Such temperatures render many commonly used SCR catalyst compositions such as mixed oxides of vanadium and titanium less catalytically effective. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The SCR catalyst compositions are preferably capable of catalyzing the reduction of the $NO_x$ component of the exhaust to achieve $NO_x$ reduction goals, even at lower exhaust temperatures, particularly when the SCR catalyst is disposed on a filter substrate such as a wall flow filter. In general the SCR catalyst should have a high specific activity combined with a high hydrothermally stability.

For Euro 6 emission regulations, the particulate emissions will be measured on a particle number basis rather than a particle mass basis. The move to particle number count for particulate matter emissions is seen as a tighter restriction on emissions. Large mean pore size, high porosity filter are not favored in number based filtration efficiency measurements and the move has been to lower mean pore size filters in order to meet the new regulations. However, as stated before, lower mean pore size filter materials are not favored for Selective Catalytic Reduction Filters (SCRF) applications. Thus there is a need to raise the filtration efficiency of large mean pore sized, high porosity filters, while retaining the high pore volume and pore accessibility needed for high SCR catalyst loading.

SUMMARY

Aspects of the invention include catalysts, catalytic articles, catalyst systems, and methods and systems utilizing catalytic articles for treating an exhaust gas stream, and methods of preparing catalysts for the treatment of such gas. As used herein, the term "catalyst system" shall include two or more chemical catalytic functions on one substrate or on more than one separate substrate.

One or more embodiments of the invention are directed to catalytic articles comprising a wall flow filter, a first SCR catalyst material and a second SCR catalyst material. The wall flow filter has an inlet end, an outlet end, alternating inlet channels and outlet channels and porous walls separating the inlet channels from the outlet channels. The inlet channels have plugs at the outlet end and the outlet channels have plugs at the inlet end. The porous walls have a mean pore diameter and a pore size distribution. The first SCR catalyst material is embedded in the porous walls at a first loading. The first SCR catalyst material has a first mean particle size and a first particle size distribution. The second SCR catalyst material is on the surface of the porous walls at a second loading. The second SCR catalyst material has a second mean particle size and a second particle size distribution. Both the first and second SCR catalyst materials contain no added platinum group metal component.

In specific embodiments, the second SCR catalyst is on inlet channels of the wall flow filter. According to some embodiments, the second mean particle size is larger than the first mean particle size.

In detailed embodiments, the first catalyst material and the second catalyst material are the same. In various embodiments, the first catalyst material and the second catalyst material are different.

In specific embodiments, the first loading and the second loading are the same. In various embodiments, the first loading and the second loading are different.

According to detailed embodiments, the second mean particle size is selected to increase the filtration efficiency of the filter. In specific embodiments, the porosity at the surface of the catalyzed porous wall adjacent the inlet channels are lower than the porosity within the wall.

In some embodiments, the ratio of the mean pore diameter to a first SCR composition particle size $D_{90}$ is in the range of about 0.5 to about 50. In detailed embodiments, the ratio of the mean pore diameter to the first SCR composition particle size $D_{90}$ is in the range of about 1.5 to about 15. In specific embodiments, the ratio of the mean pore diameter to a second SCR composition particle size $D_{90}$ is in the range of about 0.05 to about 5. In some specific embodiments, the ratio of the mean pore diameter to the second SCR composition particle size $D_{90}$ is in the range of about 0.2 to about 0.75.

Additional embodiments of the invention are directed to methods of making a catalyzed soot filter. A first SCR catalyst slurry is prepared, the slurry having a first SCR catalyst, a first slurry solids loading, a first mean particle size, a first particle size distribution and a first viscosity. The first SCR catalyst slurry being substantially free of platinum group metals. A wall flow filter substrate is coated with the first SCR catalyst slurry. The substrate having an inlet end, outlet end, inlet channels, outlet channels and porous walls separating the inlet channels from the outlet channels, the inlet channels having plugs at the outlet end and the outlet channels having plugs at the inlet end, the first SCR catalyst slurry permeates the porous walls of the substrate, the porous walls having a mean pore size. A second SCR catalyst slurry is prepared having a second SCR catalyst, a second slurry solids loading, a second mean particle size, a second particle size distribution and a second viscosity, the second SCR catalyst slurry being substantially free of platinum group metals. The substrate is coated with the second SCR catalyst slurry so that the second SCR catalyst is applied to the surface of the porous walls of the substrate adjacent the inlet channels.

In some embodiments, the second SCR catalyst slurry is the same as the first SCR catalyst slurry.

According to some detailed embodiments, the second viscosity is greater than the first viscosity. In some detailed embodiments, the second mean particle size is greater than the first mean particle size. In specific embodiments, the second slurry solids loading is greater than the first slurry solids loading.

The method of some embodiments further comprises calcining the substrate after coating with one or both of the first SCR catalyst slurry and the second SCR catalyst slurry.

According to one or more embodiments, the preparation of the first SCR catalyst slurry further comprises milling the slurry to reduce the first mean particle size and first particle size distribution. In some embodiments, preparation of the second SCR catalyst slurry further comprises milling the slurry to reduce the second mean particle size and second particle size distribution. In specific embodiments, one or more of the first SCR catalyst slurry and second SCR catalyst slurry is milled to reduce the first particle size distribution so that the ratio of the mean pore size to the first mean particle size $D_{90}$ is in the range of about 0.5 to about 50.

Additional embodiments of the invention are directed to methods of treating an exhaust gas stream. The methods comprise passing the exhaust gas through the catalytic article described herein.

Further embodiments of the invention are directed to exhaust gas treatment systems. The exhaust gas treatment systems comprise an engine and the catalytic article described herein positioned downstream of and in flow communication with the engine. In detailed embodiments, the exhaust treatment system further comprises one or more of an oxidation catalysts, a reduction catalysts, a $NO_x$ storage component, a $NO_x$ trapping component, and a reductant injector positioned downstream of and in flow communication with the engine.

BRIEF DESCRIPTION OF THE DRAWINGS

The following drawings illustrate embodiments of the invention. It is to be understood that the Figures are not intended to be to scale and that certain features such as monolith channels may be increased in size to show features according to embodiments of the invention.

DETAILED DESCRIPTION

Figure 1:
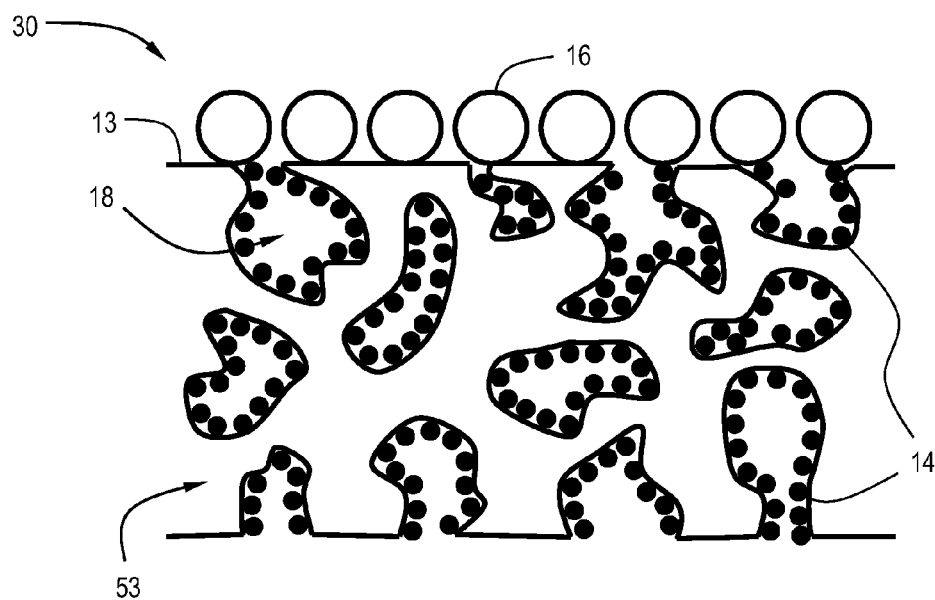
FIG. 1 shows a partial cross-sectional view of a wall-flow monolith porous wall showing a first catalyst loading and a second catalyst loading in accordance with one or more embodiments of the invention.

Before describing several exemplary embodiments of the invention, it is to be understood that the invention is not limited to the details of construction or process steps set forth in the following description. The invention is capable of other embodiments and of being practiced or being carried out in various ways.

The following terms shall have, for the purposes of this application, the respective meanings set forth below.

"Platinum group metal components" refer to platinum, palladium, rhodium, ruthenium, iridium and osmium or one of their oxides.

"Slurry solids loading" refers to the weight percent of solids in a slurry mass as measured by weight loss on calcination.

Catalyst "loading" refers to the weight of the catalyst on a substrate or on a portion of the substrate. For instance, the loading of a first catalyst within the porous walls of a substrate would be the first catalyst loading.

"Flow communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relate to another component.

Reference to "substantially all" refers to greater than about 95% by weight. In more specific embodiments, "substantially all" refers to greater than about 99% by weight. In other words, when substantially all of the SCR catalyst is in the outlet portion of the walls, no SCR catalyst is intentionally distributed within the inlet portion of the walls.

Reference to "substantially uniform porosity in cross-section" refers to porosity that is similar in pore size and distribution throughout the cross-section of the wall. For example, substantially uniform porosity in cross-section would not include a wall structure in which the pore size through the wall cross-section is intentionally varied, for example, where the pores are larger adjacent the inlet surface compared to the pores adjacent the outlet surface.

The term "SCR function" will be used herein to refer to a chemical process described by the stoichiometric Eq 1.

$$4NO_x + 4NH_3 + (3-2x)O_2 \rightarrow 4N_2 + 6H_2O \qquad \text{Eq 1}$$

More generally it will refer to any chemical process in which $NO_x$ and $NH_3$ are combined to produce preferably $N_2$. The term "SCR composition" refers to a material composition effective to catalyze the SCR function.

One method of raising the filtration efficiency of large mean pore sized, high porosity filters, while retaining the high pore volume and pore accessibility is to add a layer of SCR catalyst on top of the channel walls in the inlet channels of the filter. Without being bound to any particular theory of operation, it is believed that this added layer would help during the soot loading of the filter to form the soot cake faster, thus increasing the efficiency of the filter over the test cycle. This additional SCR catalyst layer might be coated on the inlet channels after the majority of the SCR catalyst was already loaded into the filter walls. By tailoring the mean particle size and particle size distribution, the additional catalyst coating could increase the filtration efficiency without excessive back pressure increase. The layer would have the added benefit of likely lowering the soot loaded back pressure since it might prevent soot from going into the wall prior to the soot cake formation. Embodiments of the invention allow for the use of large mean pore size, high porosity filter substrates that are favored for SCRF while achieving the number based filtration efficiency required by Euro 6 applications.

One or more embodiments of the invention are directed to catalytic articles 30 comprising a filter, a first SCR catalyst 14 material and a second SCR catalyst 16 material. FIG. 1 shows a partial cross-sectional view of a porous wall 53 of a filter substrate. In specific embodiments, the filter is a wall flow filter having porous walls 53, an inlet end 54 and an outlet end 56. A first SCR catalyst 14 material is embedded in the porous walls 53. A second SCR catalyst 16 material is on the surface 13 of the porous walls. In specific embodiments, both the first SCR catalyst 14 and second SCR catalyst 16 are substantially free of platinum group metal components.

FIG. 1 shows the second SCR catalyst 16 being coated on one side of the porous wall 53 of the substrate. The one side can be either the inlet side or outlet side of the porous wall 53, depending on the manner of producing the catalyst article. In specific embodiments, the second SCR catalyst 16 is coated on the inlet side of the porous wall 53 so that an exhaust gas stream would encounter the second SCR catalyst 16 prior to the first SCR catalyst 14. In detailed embodiments, the second SCR catalyst 16 is coated on both the inlet side and outlet side of the porous wall 53. In some embodiments, the second SCR catalyst 16 is coated on the outlet side of the porous wall 53.

As used in this specification and the appended claims, the term "substantially free of platinum group metal components" means that platinum group metal components are not intentionally added to an amount greater than about 5% by weight of the SCR catalyst material. In more specific embodiments, the term "substantially free of platinum group metal components" means that platinum group metal components make up less than about 1% by weight of the SCR catalyst material.

In detailed embodiments, the wall flow filter has a substantially uniform mean pore size. As used in this specification and the appended claims, the term "substantially uniform mean pore size" means that the mean pore size across the wall does not vary by more than a factor of 10. In specific embodiments, the wall flow filter has a mean pore size in the range of about 3 µm and about 35 µm. In other detailed embodiments, the mean pore size is in the range of about 5 µm and about 30 µm, or in the range of about 10 µm to about 25 µm. In some detailed embodiments, the mean pore size is greater than about 1 µm, 2 µm, 3 µm, 4 µm, 5 µm, 6 µm, 7 µm, 8 µm, 9 µm, 10 µm, 11 µm, 12 µm, 13 µm, 14 µm or 15 µm. In some detailed embodiments, the mean pore size is less than about 40 µm, 39 µm, 38 µm, 37 µm, 36 µm, 35 lam, 34 µm, 33 µm, 32 µm, 31 µm, 30 µm, 29 µm, 28 µm, 27 µm, 26 µm or 25 µm. In specific embodiments, the mean pore size is effective to allow build-up of soot on the inlet side of the filter wall. In some specific embodiments, the mean pore size is effective to allow some soot to enter the pores on the inlet surface of the porous walls.

The second SCR catalyst 16 can be applied the walls of the inlet passages and/or the outlet passages. In specific embodiments, the second SCR catalyst 16 is coated on the walls of the inlet passages only. Some material may diffused through the wall and reside on the wall of the outlet passages, but the amount should be negligible.

The first SCR catalyst 14 and second SCR catalyst 16 can be applied to the entire length or a partial length of the wall flow filter 30. In detailed embodiments, the second SCR catalyst 16 is on the inlet end 54 of the wall flow filter 30. In specific embodiments, the second SCR catalyst 16 coats a partial length of the wall flow filter 30. The partial length can be in the range of about 5 to about 95% of the length, or in the range of about 25 to about 75% of the length, or about 50% of the axial length of the wall flow filter 30.

Both the first SCR catalyst 14 and second SCR catalyst 16 have physical properties including mean particle sizes and particle size distributions. The mean particle size of the first SCR catalyst 14 is smaller than the mean pore diameter of the porous walls 53, allowing the first SCR catalyst 14 to enter the porous walls 53. The mean particle size of the second SCR catalyst 16 in detailed embodiments is larger than mean particle size of the first SCR catalyst 14. In specific embodiments, the mean particle size of the second SCR catalyst 16 is larger than the mean pore diameter of the porous walls 53, preventing the second SCR catalyst 16 from entering the porous walls and remaining on the surface. In more specific embodiments, the mean particle size of the second SCR catalyst 16 is selected to increase the filtration efficiency of the filter.

The particle size distribution is a representation of the range of particle sizes that a specified percentage of particles exist. The shape of the particle size distribution can vary depending on the processing of the SCR composition. The shape of the particle size distribution is not limiting and can be any suitable shape, including, symmetrical and asymmetrical distributions. In detailed embodiments, the ratio of the mean pore diameter to a first SCR composition particle size $D_{90}$ is in the range of about 0.5 to about 50. As used in this specification and the appended claims, the term "$D_{90}$" or "SCR composition particle size $D_{90}$" refers to the value of the particle size distribution such that 90% of the particles have particles sizes equal to or smaller than the value. In specific embodiments, the ratio of the mean pore diameter of the porous walls to the first SCR composition particle size $D_{90}$ is in the range of about 1.5 to about 15. In various embodiments, the ratio of the mean pore diameter to the first SCR composition particle size $D_{90}$ is greater than about 0.5, 1, 1.5, 2, 3, 4, 5, 7.5, 10, 12.5 or 15. In some embodiments, the ratio of the mean pore diameter to a second SCR composition particle size $D_{90}$ is in the range of about 0.05 to about 5. In detailed embodiments, the ratio of the mean pore diameter to the second SCR composition particle size $D_{90}$ is in the range of about 0.2 to about 0.75.

Any suitable catalyst materials can be used and embodiments of the invention are not limited to any specific catalyst materials. Additionally, the first SCR catalyst 14 material can be the same as the second SCR catalyst 16 material. In detailed embodiments, the first SCR catalyst 14 material is different than the second SCR catalyst 16 material. In specific embodiments, one or both of the first SCR catalyst 14 material and the second SCR catalyst 16 material include a mixture of two or more suitable catalysts. The mixtures comprising the first and second SCR catalyst materials can be the same or different.

In one or more embodiments of the invention, the first SCR catalyst 14 has a volumetric loading that is about equal to the second SCR catalyst 16 loading. In detailed embodiments, the first SCR catalyst 14 loading and the second SCR catalyst 16 loading are different. In various embodiments, the first loading can be greater than, equal to, or less than the second SCR catalyst loading.

The Substrate

Figure 2:
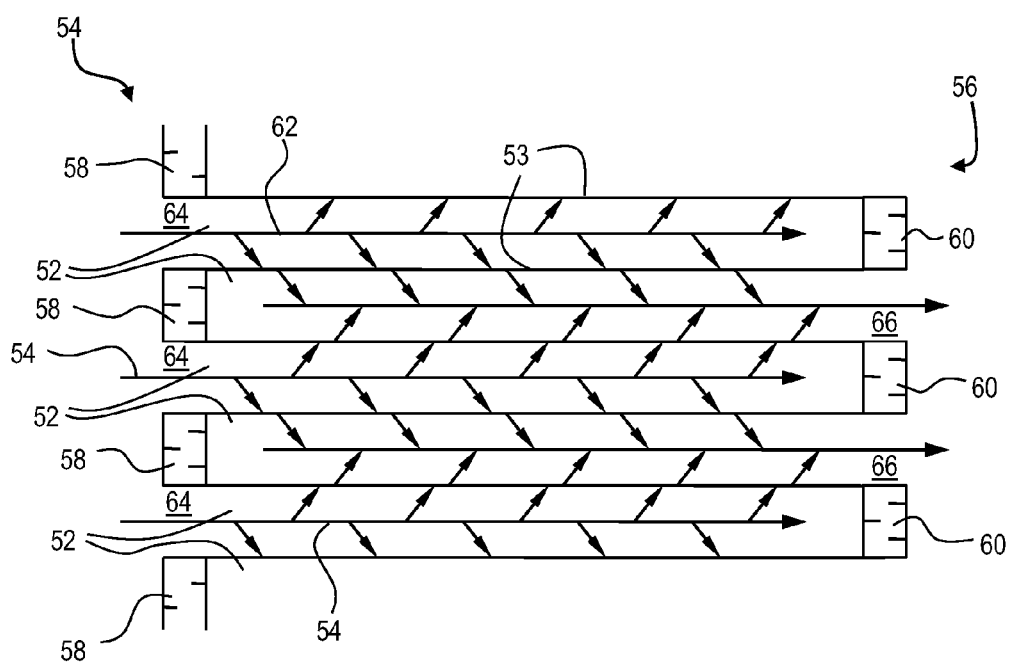
FIG. 2 shows a cross-section of a wall-flow monolith in accordance with one or more embodiments of the invention.
Figure 3:
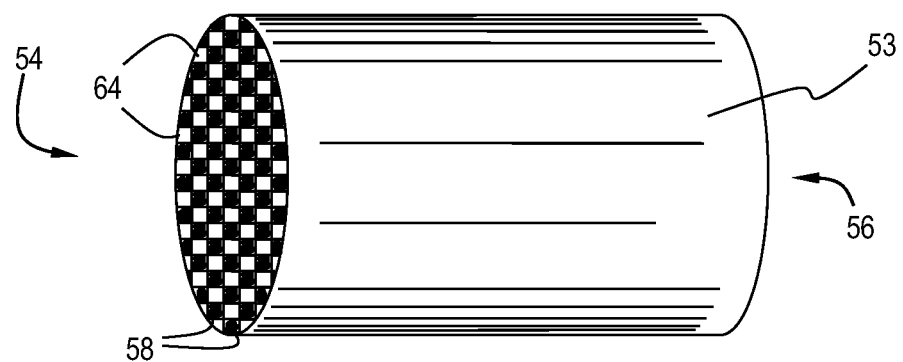
FIG. 3 shows a perspective view of a wall-flow monolith according to one or more embodiments of the invention.

According to one or more embodiments, the substrate for the catalyst may be any of those materials typically used for preparing automotive catalysts and will typically comprise a metal or ceramic wall flow filter structure. In specific embodiments, the filter is a wall flow filter (also referred to as a "wall flow monolith"). FIGS. 2 and 3 illustrate a wall flow filter 30 which has a plurality of longitudinally extending passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

The porous walls 53 of the wall flow filter 30 can be uniform or graded. In specific embodiments, the wall flow filter 30 has substantially uniform porosity in cross-section. In some specific embodiments, the porosity at the surface of the porous wall 53 is lower than the porosity within the filter wall 53. The porosity may increase in certain embodiments, where the porosity at the inlet side of the porous walls is lower than the porosity at the outlet side of the porous walls. Additionally, the grading can be reversed, so that the pore size decreases from the inlet side to the outlet side of the porous walls.

Ceramic substrates may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

In another embodiment, the monolith substrate is present in the form of a ceramic foam or metal foam. Monolith substrates in the form of foams are well known, e.g., see U.S. Pat. No. 3,111,396 and SAE Technical Paper 971032, entitled "A New Catalyst Support Structure For Automotive Catalytic Converters" (February 1997), both of which are hereby incorporated by reference.

SCR Composition

In accordance with one or more embodiments of the invention, a component effective to catalyze the SCR function (herein referred to as an "SCR component") is utilized in a coating as part of a $NO_x$ abatement catalyst composition. Typically, the SCR component is part of a composition that includes other components in a coating. However, in one or more embodiments the $NO_x$ abatement catalyst composition may include only the SCR component. In specific embodiments, both the first SCR catalyst and second SCR catalyst are substantially free of platinum group metal components. The various SCR compositions discussed herein can be used individually or in combination for the first SCR catalyst and/or the second SCR catalyst.

In some embodiments, the invention utilizes an SCR component which consists of a microporous inorganic framework or molecular sieve onto which a metal from one of the groups VB, VIIB, VIIB, VIIIB, IB, or IIB of the periodic table has been deposited onto extra-framework sites on the external surface or within the channels, cavities, or cages of the molecular sieves. Metals may be in one of several forms, including, but not limited to, zerovalent metal atoms or clusters, isolated cations, mononuclear or polynuclear oxycations, or as extended metal oxides. In specific embodiments, the metals include iron, copper, and mixtures or combinations thereof.

In certain embodiments, the SCR component contains in the range of about 0.10% and about 10% by weight of a group VB, VIIB, VIIB, VIIIB, IB, or IIB metal located on extraframework sites on the external surface or within the channels, cavities, or cages of the molecular sieve. In preferred embodiments, the extraframework metal is present in an amount of in the range of about 0.2% and about 5% by weight.

The microporous inorganic framework may consist of a microporous aluminosilicate or zeolite having any one of the framework structures listed in the *Database of Zeolite Structures* published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Some embodiments utilize aluminosilicate zeolites that have a silica/alumina molar ratio (defined as $SiO_2/Al_2O_3$ and abbreviated as SAR) from at least about 5, preferably at least about 20, with useful ranges of from about 10 to 200.

In a specific embodiment, the SCR component includes an aluminosilicate molecular sieve having a CHA crystal framework type, an SAR greater than about 15, and copper content exceeding about 0.2 wt %. In a more specific embodiment, the SAR is at least about 10, and copper content from about 0.2 wt % to about 5 wt %. Zeolites having the CHA structure, include, but are not limited to natural chabazite, SSZ-13, LZ-218, Linde D, Linde R, Phi, ZK-14, and ZYT-6. Other suitable zeolites are also described in U.S. Pat. No. 7,601,662, entitled "Copper CHA Zeolite Catalysts," the entire content of which is incorporated herein by reference, published as PCT International Publication No. WO 2008/106519.

According to one or more embodiments of the invention, SCR compositions which include non-zeolitic molecular sieves are provided. As used herein, the terminology "non zeolitic molecular sieve" refers to corner sharing tetrahedral frameworks where at least a portion of the tetrahedral sites are occupied by an element other than silicon or aluminum. Non-limiting examples of such molecular sieves include alumino-phosphates and metal-aluminophosphates, wherein metal could include silicon, copper, zinc or other suitable metals. Such embodiments may include a non-zeolitic molecular sieve having a crystal framework type selected from CHA, FAU, MFI, MOR, and BEA.

Non-zeolitic compositions can be utilized in the SCR component according to embodiments of the present invention. Specific non-limiting examples include sillicoaluminophosphates SAPO-34, SAPO-37, SAPO-44. Synthesis of synthetic form of SAPO-34 is described in U.S. Pat. No. 7,264,789, which is hereby incorporated by reference. A method of making yet another synthetic non-zeolitic molecular sieve having chabazite structure, SAPO-44, is described in U.S. Pat. No. 6,162,415, which is hereby incorporated by reference.

SCR compositions consisting of vanadium supported on a refractory metal oxide such as alumina, silica, zirconia, titania, ceria and combinations thereof are also well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

In general, it is desirable for the SCR composition exhibits both good low temperature $NO_x$ conversion activity ($NO_x$ conversion >40% at 200° C.) and good high temperature $NO_x$ conversion activity ($NO_x$ conversion >40% at 450° C.) prior to aging of the composition. In specific embodiments, the SCR composition exhibits both good low temperature $NO_x$ conversion activity ($NO_x$ conversion >50% at 200° C.) and good high temperature $NO_x$ conversion activity ($NO_x$ conversion >50% at 450° C.) prior to aging of the composition. The $NO_x$ activity is measured under steady state conditions in a gas mixture of 500 ppm NO, 500 ppm $NH_3$, 10% $O_2$, 5% $H_2O$, balance $N_2$ at a volume-based space velocity of 80,000 $h^{-1}$.

Method of Preparing a Catalyst

A catalyst or catalytic article according to one or more embodiments of the present invention can be prepared in a two-step process. In the first step, a carrier substrate, which, in specific embodiments, is a honeycomb substrate with porous walls and containing channels of dimensions in the range of about 100 channels/$in^2$ and 1000 channels/$in^2$, is coated with a first SCR catalyst. The substrate is dried and calcined to fix the first SCR catalyst in the porous walls of the substrate. The substrate is then coated with a second SCR catalyst. The substrate is dried and calcined to fix the second SCR catalyst onto the walls of the substrate.

In specific embodiments, the substrate comprises a wall flow filter having gas permeable walls formed into a plurality of axially extending channels, each channel having one end plugged with any pair of adjacent channels plugged at opposite ends thereof. In detailed embodiments, the second SCR catalyst coating is formed on the walls of the inlet channels of the substrate. In specific embodiments, the second SCR catalyst coating is formed on the walls of both the inlet and outlet channels.

Additional embodiments of the invention are directed to methods of making a catalyzed soot filter. A first SCR catalyst slurry is prepared with a first slurry solids loading, and mean particle size sufficient to allow the slurry to permeate the porous walls of a substrate. The substrate is coated with the first SCR catalyst slurry so that the first SCR catalyst slurry permeated the porous walls of the substrate. A second SCR catalyst slurry is prepared having a second slurry solids loading and mean particle size. The substrate can then be coated with the second SCR catalyst slurry so that the second SCR catalyst is applied to the surface of the porous walls of the substrate. In detailed embodiments, the substrate is calcined after coating with one or both of the first SCR catalyst slurry and the second SCR catalyst slurry In specific embodiments, the second SCR catalyst slurry is the first SCR catalyst slurry. This would result in a substrate having a SCR catalyst coating permeating the porous walls and coating the porous walls once sufficient material has entered the pores.

Applying an SCR catalyst coating inside the porous walls and on the surface of the walls can be accomplished by altering a variety of physical parameters of the slurries. These properties include, but are not limited to, the slurry viscosity, the mean particle size and the slurry solids loading. In detailed embodiments, the viscosity of the second SCR catalyst slurry is greater than or less than the viscosity of the first SCR catalyst slurry. In specific embodiments, the mean particle size of the second SCR catalyst slurry is greater than or less than the mean particle size of the first SCR catalyst slurry. In particular embodiments, the slurry solids loading of the second SCR catalyst slurry is greater than or less than the slurry solids loading of the first SCR catalyst slurry.

In specific embodiments, the first SCR catalyst slurry is milled to reduce the mean particle size and particle size distribution. In some embodiments, the second SCR catalyst slurry is milled to reduce the second mean particle size and distribution. The slurry of specific embodiments is milled to reduce the first particle size distribution so that the ratio of the mean pore size to the first particle size $D_{90}$ is in the range of about 0.5 to about 50, where the $D_{90}$ is defined as the maximum particle size encompassing about 90% of the first particle size distribution.

Emissions Treatment System

Figure 4:
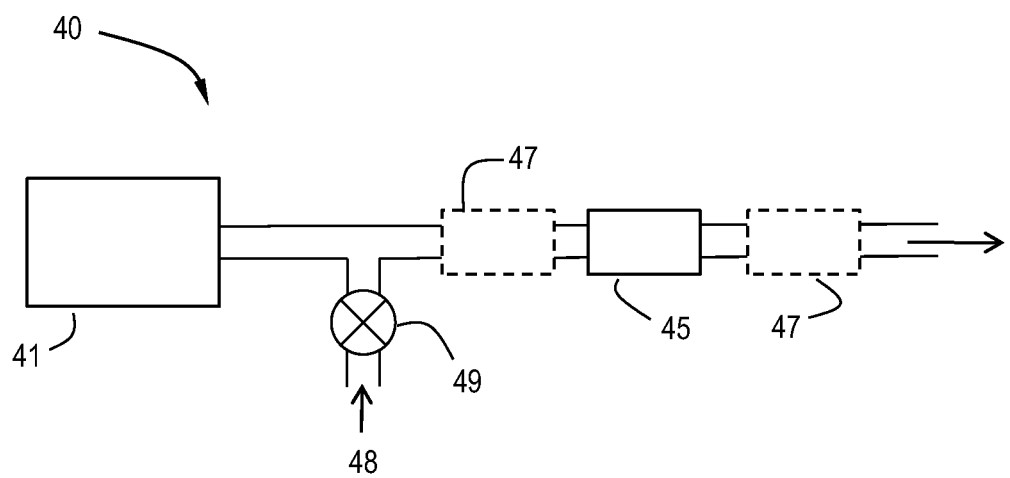
FIG. 4 is a schematic of an engine emission treatment system, in accordance with one or more embodiment of the present invention.

An aspect of the invention is directed to emissions treatment systems for treating exhaust gases emitted by a diesel engine. FIG. 4 shows an exemplary embodiment of the emissions treatment system 40 including a diesel engine 41 emitting an exhaust stream including particulate matter, $NO_x$ and carbon monoxide. A catalyst soot filter 45 is positioned downstream of and in flow communication with the diesel engine 41. The catalyzed soot filter 45 has a first SCR catalyst coating permeating the porous walls of the substrate and a second SCR catalyst coating on the surface of the porous walls. In detailed embodiments, the first substrate 45 is a wall-flow substrate. In specific embodiments, the first SCR catalyst and the second SCR catalyst are substantially free of platinum group metals.

Figure 5:
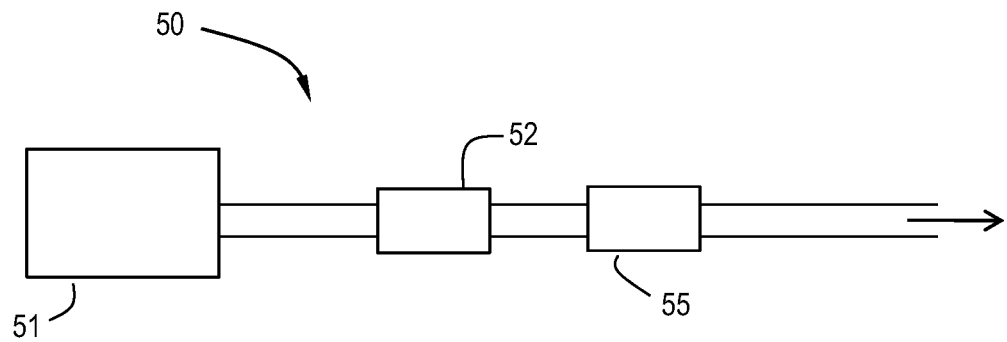
FIG. 5 is a schematic of an engine emission treatment system in accordance with one or more embodiments of the invention.
Figure 6:
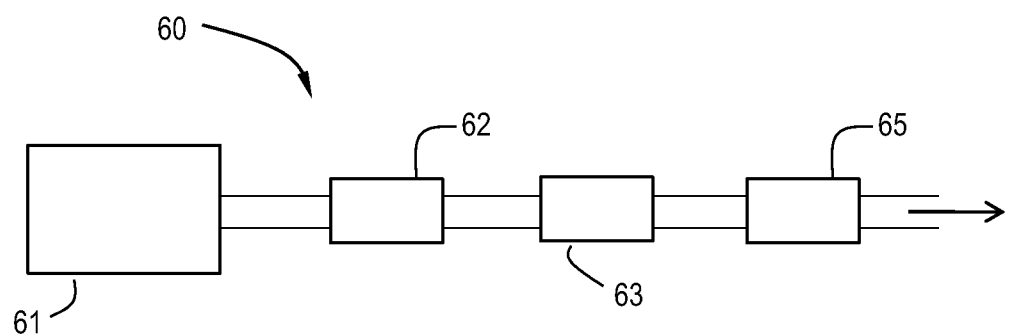
FIG. 6 is a schematic of an engine emission treatment system in accordance with one or more embodiments of the invention.

Various embodiments of the engine treatment system can include other optional catalyst components 47. The optional components 47 can be placed before and/or after the catalyzed soot filter 45. Non-limiting examples of suitable optional components 47 include oxidation catalysts, reduction catalysts, $NO_x$ storage/trapping components. Some embodiments of the treatment system may also include a reductant or air injector 48 and a metering device 49. The reductant or air injection 48 is shown upstream of the catalyzed soot filter 45, but can be located downstream of the filter 45. FIG. 5 shows a specific embodiment of an emissions treatment system 50. Downstream of, and in flow communication with the engine 51 is a diesel oxidation catalyst (DOC) 52. Downstream of and in flow communication with the DOC is a catalyzed soot filter 55 as described herein. FIG. 6 shows another specific embodiment of an emissions treatment system 60. Downstream of, and in flow communication with an engine 61 is a diesel oxidation catalyst 62. Downstream of, and in flow communication with the DOC 62, is a lean $NO_x$ trap (LNT) 63. Downstream of, and in flow communication with the LNT 63, is a catalyzed soot filter 65 as described herein.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalytic article comprising:
   a wall flow filter having an inlet end, an outlet end, alternating inlet channels and outlet channels and porous walls separating the inlet channels from the outlet channels, the inlet channels having plugs at the outlet end and the outlet channels having plugs at the inlet end, the porous walls having a mean pore diameter and a pore size distribution;
   a first ammonia SCR catalyst material embedded in the porous walls at a first loading, the first SCR catalyst material having a first mean particle size and first particle size distribution; and
   a second ammonia SCR catalyst material on the surface of the porous walls at a second loading, the second SCR catalyst material having second mean particle size and second particle size distribution, wherein both the first and second SCR catalyst material contain no added platinum group metal component; wherein the second mean particle size is larger than the first mean particle size.

2. The catalytic article of claim 1, wherein the second ammonia SCR catalyst is on inlet channels of the wall flow filter.

3. The catalytic article of claim 1, wherein the first loading and the second loading are the same.

4. The catalytic article of claim 1, wherein the first loading and the second loading are different.

5. The catalytic article of claim 1, wherein the first catalyst material and the second catalyst material are different.

6. The catalytic article of claim 5, wherein the first loading and the second loading are the same.

7. The catalytic article of claim 5, wherein the first loading and the second loading are different.

8. The catalytic article of claim 1, wherein the porosity at the surface of the catalyzed porous wall adjacent the inlet channels is lower than the porosity within the wall.

9. The catalytic article of claim 1, wherein the ratio of the mean pore diameter to a first ammonia SCR composition particle size $D_{90}$ is in the range of about 0.5 to about 50.

10. The catalytic article of claim 9, wherein the ratio of the mean pore diameter to the first ammonia SCR composition particle size $D_{90}$ is in the range of about 1.5 to about 15.

11. The catalytic article of claim 1, wherein the ratio of the mean pore diameter to a second ammonia SCR composition particle size $D_{90}$ is in the range of about 0.05 to about 5.

12. The catalytic article of claim 11, wherein the ratio of the mean pore diameter to the second ammonia SCR composition particle size $D_{90}$ is in the range of about 0.2 to about 0.75.

13. The catalytic article of claim 1, wherein the first and second ammonia SCR catalyst materials comprise a zeolitic or non-zeolitic molecular sieve.

14. The catalytic article of claim 13, wherein the molecular sieve contains a metal from one of the groups VB, VIB, VIIB, VIIIB, IB, or IIB of the periodic table distributed on or within the molecular sieve, the metal being present in an amount between 0.1% and 10% by wt. of the molecular sieve.

15. The catalytic article of claim 14, wherein the metal is selected from Cu, Fe, and mixtures or combinations thereof.

16. The catalytic article of claim 14, wherein the metal is Cu.

17. The catalytic article of claim 14, wherein the metal is Fe.

18. A method of making a catalyzed soot filter comprising:
preparing a first ammonia SCR catalyst slurry having a first ammonia SCR catalyst, a first slurry solids loading, a first mean particle size, a first particle size distribution and a first viscosity, the first ammonia SCR catalyst slurry being substantially free of platinum group metals;
coating a wall flow filter substrate with the first ammonia SCR catalyst slurry, the substrate having an inlet end, outlet end, inlet channels, outlet channels and porous walls separating the inlet channels from the outlet channels, the inlet channels having plugs at the outlet end and the outlet channels having plugs at the inlet end, the first ammonia SCR catalyst slurry permeates the porous walls of the substrate, the porous walls having a mean pore size;
preparing a second ammonia SCR catalyst slurry having a second ammonia SCR catalyst, a second slurry solids loading, a second mean particle size, a second particle size distribution and a second viscosity, the second ammonia SCR catalyst slurry being substantially free of platinum group metals; and
coating the substrate with the second ammonia SCR catalyst slurry so that the second ammonia SCR catalyst is applied to the surface of the porous walls of the substrate adjacent the inlet channels; wherein the second mean particle size is larger than the first mean particle size.

19. The method of claim 18, wherein the second viscosity is greater than the first viscosity.

20. The method of claim 18, wherein the second mean particle size is greater than the first mean particle size.

21. The method of claim 18, wherein the second slurry solids loading is greater than the first slurry solids loading.

22. The method of claim 18, further comprising calcining the substrate after coating with one or both of the first ammonia SCR catalyst slurry and the second ammonia SCR catalyst slurry.

23. The method of claim 18, wherein preparing the first ammonia SCR catalyst slurry further comprises milling the slurry to reduce the first mean particle size and first particle size distribution.

24. The method of claim 18, wherein preparation of the second ammonia SCR catalyst slurry further comprises milling the slurry to reduce the second mean particle size and second particle size distribution.

25. The method of claim 23, wherein the slurry is milled to reduce the first particle size distribution so that the ratio of the mean pore size to the first mean particle size $D_{90}$ is in the range of about 0.5 to about 50.

26. The method of claim 18, wherein the first and second SCR catalyst slurries comprise a zeolitic or non-zeolitic molecular sieve.

27. The method of claim 26, wherein the molecular sieve contains a metal from one of the groups VB, VIB, VIIB, VIIIB, IB, or IIB of the periodic table distributed on or within the molecular sieve, the metal being present in an amount between 0.1% and 10% by wt. of the molecular sieve.

28. The method of claim 27, wherein the metal is selected from Cu, Fe, and mixtures or combinations thereof.

29. The method of claim 27, wherein the metal is Cu.

30. The method of claim 27, wherein the metal is Fe.

31. A method of treating an exhaust gas stream from a diesel engine comprising passing the exhaust gas through the catalytic article of claim 1.

32. An exhaust gas treatment system comprising a diesel engine and the catalytic article of claim 1 positioned downstream of and in flow communication with the engine.

33. The exhaust gas treatment system of claim 32, further comprising one or more of an oxidation catalyst, a reduction catalyst, a $NO_x$ storage component, a $NO_x$ trapping component, and a reductant injector positioned downstream of and in flow communication with the engine.

* * * * *